United States Patent [19]

Patarcity

[11] Patent Number: 4,536,018
[45] Date of Patent: Aug. 20, 1985

[54] RUBBER-BACKED EXPANSION JOINT

[75] Inventor: Adam J. Patarcity, Levittown, Pa.

[73] Assignee: Kennecott Corporation, Cleveland, Ohio

[21] Appl. No.: 428,541

[22] Filed: Sep. 30, 1982

[51] Int. Cl.³ .............................................. F16L 27/10
[52] U.S. Cl. ..................................... 285/229; 285/299
[58] Field of Search .................. 285/229, 226, 299, 57

[56] References Cited

U.S. PATENT DOCUMENTS

| | | |
|---|---|---|
| 797,152 | 8/1905 | Sheckler . |
| 2,308,757 | 1/1943 | Hulsberg .............................. 285/162 |
| 2,459,720 | 1/1949 | Poltorak .................................. 288/33 |
| 2,738,993 | 3/1956 | Wilson .................................... 285/90 |
| 2,879,804 | 3/1959 | Hammond .............................. 138/56 |
| 2,890,066 | 6/1959 | Kerr ...................................... 285/67 |
| 2,983,961 | 5/1961 | Titterton et al. . |
| 3,030,253 | 4/1962 | St John et al. . |
| 3,051,512 | 8/1962 | Cranston .............................. 285/114 |
| 3,139,115 | 6/1964 | Bawcom et al. ................. 285/229 X |
| 3,276,929 | 10/1966 | Ferch .................................... 156/83 |
| 3,305,251 | 2/1967 | Skinner .............................. 285/229 |
| 3,400,952 | 9/1968 | Swenson et al. ...................... 285/47 |
| 3,446,248 | 5/1969 | Press . |
| 3,606,400 | 9/1971 | Hines ................................. 285/235 |
| 3,626,988 | 12/1971 | Cha . |
| 3,633,945 | 1/1972 | Press et al. . |
| 3,723,234 | 3/1973 | MacDonald . |
| 4,058,328 | 11/1977 | Nickerson . |
| 4,101,150 | 7/1978 | Thawley et al. .................... 285/226 |

FOREIGN PATENT DOCUMENTS

| | | |
|---|---|---|
| 336054 | 8/1956 | Australia . |
| 1048449 | 1/1959 | Fed. Rep. of Germany . |
| 2902960 | 7/1980 | Fed. Rep. of Germany ...... 285/229 |

Primary Examiner—Richard J. Scanlan, Jr.
Attorney, Agent, or Firm—R. Lawrence Sahr

[57] ABSTRACT

An expansion joint for connecting pipe ends includes a fluorocarbon polymer tube having a reinforcing fabric embedded within it. The ends of the tube have radially extending flanges which are adapted to be in sealing relationship with the pipe ends. The tube has an annular arch spaced between the tube flanges. Metal stub ends having a radially extending flange at one end are in abutting relation to the tube flanges, thereby providing support and improved sealing from the otherwise flexible tube flange. A rubber backing is fastened to the fabric embedded in the tube. A back-up ring having peripheral fastener apertures is disposed about the tube at each end of the tube. The tube flanges are compressed between the back-up ring and pipe flange when the latter two are bolted together. A washer, spaced between the backup ring and rubber back permits the ring to be rotated about the tube to allow alignment of peripheral ring fastener apertures with corresponding fastener apertures in the pipe flange.

15 Claims, 2 Drawing Figures

RUBBER-BACKED EXPANSION JOINT

BACKGROUND OF THE INVENTION

1. Field of the Invention

The invention relates to connectors used to join the ends of pipes together and, more particularly, to expansion joints which permit the ends of joined pipes to move relative to each other.

2. Description of the Prior Art

Expansion joints, generally, are flexible connectors of pipe ends. They usually take the form of a tube composed of reinforced rubber or other elastomer having integral, radially extending flanges at each end. One or more expandible annular arches integral with the tube may be disposed intermediate the flanges. The flanges may have apertures about their periphery through which bolts may be fitted in order to secure the expansion joint flanges to flanges of pipes which are desired to be flexibly connected.

As a means for connecting pipes together, expansion joints offer numerous benefits. Expansion joints are lightweight and small as compared with metal expansion bends or loops. Thus, installation labor is minimized and, when bolted into place, the expansion joint takes up a minimum of space. More importantly, expansion joints permit the controlled axial movement of the joined pipes by compressing or elongating while at the same time compensating for lateral, torsional, and angular pipe movement. Vibration and sound transmission are also considerably reduced using an elastomeric expansion joint as compared to metal expansion bends or loops.

In corrosive applications, elastomer expansion joints may be lined with a fluorocarbon polymer tube, such as tetrafluoroethylene (TFE). Fluorocarbon polymers are characteristically resistant to chemical attack, are heat stable, have a non-stick surface, and a low coefficient of friction. While expansion joints having fluorocarbon polymer liners offer the above advantages, there are several problems associated with the use of such liners which have not been adequately addressed.

One of these problems relates to the non-stick characteristic of fluorocarbon polymers. When a fluorocarbon polymer liner is used, it is desirable to have it firmly secured to the rubber of the expansion joint, especially in vacuum applications where the liner might otherwise pull away. But being non-stick, it is difficult to secure a fluorocarbon liner to the rubber cover of an expansion joint. A solution to this adhesion problem has been to first embed a knit cloth into the fluorocarbon polymer liner as taught by MacDonald, U.S. Pat. No. 3,723,234, the disclosure of which is incorporated herein by reference. The cloth thus is mechanically interlocked with the fluorocarbon liner, providing a glueable surface by which the otherwise non-stick liner can be adhered to the rubber. Even so, due to the very nature and purpose of expansion joints, the rubber back tends to flex, an expected and desirable feature. However, the flexing of the rubber back may also result in a separation of the rubber back from the liner, especially in the vicinity of the expansion joint flanges where the seal with the pipes is effected. Further, when expansion joints are used in a corrosive environment, corrosives tend to seep in between the fluorocarbon polymer liner and the rubber back at the flange, deteriorating the rubber and attacking the adhesive bond, causing separation. Once the rubber back separates from the liner, the integrity of the expansion joint is lost and the rubber back no longer provides structural support for the liner. The end result is a leakage of corrosives at the site of the pipe-expansion joint seal, resulting in a pressure drop in the line and plant down-time.

Part of the leaking problem originates with the integral rubber or elastomer flanges at either end of the expansion joint. These flanges generally have a large radial dimension and include a plurality of apertures through which bolts may be fitted. The flanges are bolted between a back-up ring and the pipe flange; a gasket usually is interposed between the expansion joint flange and the pipe flange. But unlike the rigid pipe flange and back-up ring, the expansion joint flange is flexible. Thus, when the pipes to which the expansion joint is bolted begin to move about, the flexible expansion joint will distort somewhat, resulting in only a partial seal at the expansion joint flange-gasket-pipe flange interface. Also, a partial seal may result at the places where the bolts pass through the apertures. Leakage of whatever substance is being piped then will result. Further, this leakage will aggravate any separation which might have begun already between the liner and rubber back as a result of flexing.

Yet an additional concern relates to the apertures formed in the flanges. Since the flanges are rigidly connected to the body of the expansion joint, the apertures cannot be moved circumferentially about the expansion joint except by applying torsional forces to the flanges. In turn, misalignments between apertures in pipe flanges and the apertures in the expansion joint flanges will be difficult to correct. It is possible that the expansion joint will have to be connected between pipe ends in a twisted condition, thus aggravating problems relating to leakage at the flange-gasket-pipe flange interface.

Finally, where a lined expansion joint is used under vacuum conditions and elevated temperatures, the liner has a tendency to pull away from the rubber back due to the poor adhesion characteristics of fluorocarbon polymers. While this problem is alleviated somewhat by the knit cloth embedded in the liner as previously discussed, with the additional forces imposed on the liner by a vacuum, coupled with the distortion of the expansion joint due to pipe movement and the bond-destroying effects of chemical attack, especially acute at elevated temperatures, it will be only a short period of time before the liner pulls away from the rubber back, destroying the integrity and usefulness of the expansion joint.

SUMMARY OF THE INVENTION

The present invention overcomes the foregoing and other drawbacks of the prior art by providing a novel and improved expansion joint having superior sealing characteristics at the expansion joint flange-gasket-pipe flange interface, while taking full advantage of the unique characteristics of fluorocarbon polymers.

The expansion joint according to the present invention is comprised of a fluorocarbon polymer tube having an annular arch spaced between radially extending integral flanges located at each end of the tube. A knit reinforcing fabric is partially embedded within and mechanically interlocked with the outside of the fluorocarbon polymer tube. A chemically resistant adhesive, having a service temperature of around 400° F., bonds the fabric backed fluorocarbon polymer tube to structural components of the expansion joint. These structural components include a pair of rigid stub ends.

The stub ends, tubular in shape and having a radially extending flange at one end, are positioned such that the front face of the stub end flange abuts the rear face of the tube flange, thereby providing a rigid support for the otherwise flexible expansion joint flange. In the preferred embodiment, the tube and stub end flanges are of relatively small radial dimension as compared with a back-up ring and pipe flange and do not include apertures for bolts. When the expansion joint then is bolted between the back-up ring and pipe flange, flexing of the expansion joint flange is greatly reduced, which in turn reduces the potential for leakage at the expansion joint flange gasket-pipe flange interface.

The reinforced rubber back, applied uncured to the tubular portion of the stub ends and the fabric back of the fluorocarbon polymer liner and then vulcanized, flexibly bolsters and insulates the liner, thus performing a function for which it is best suited rather than as an inefficient flexible flange.

In the preferred embodiment, a fluorocarbon polymer washer is spaced between the back-up ring and the rubber back prior to vulcanizing the rubber back. Accordingly, the back-up ring will not be bonded to the rubber back. In turn, the back-up ring can be rotated easily about the liner in order to align the bolt holes in the back-up ring with the fixed bolt holes of the abutting pipe flange to which the back-up ring is to be fastened. Thus, torsional loads need not be applied to the expansion joint in order to connect the pipe ends.

These and other features and advantages, and a fuller understanding of the invention, may be had by referring to the following description and claims, taken in conjunction with the accompanying drawings.

DESCRIPTION OF THE PREFERRED EMBODIMENT

Figure 1:
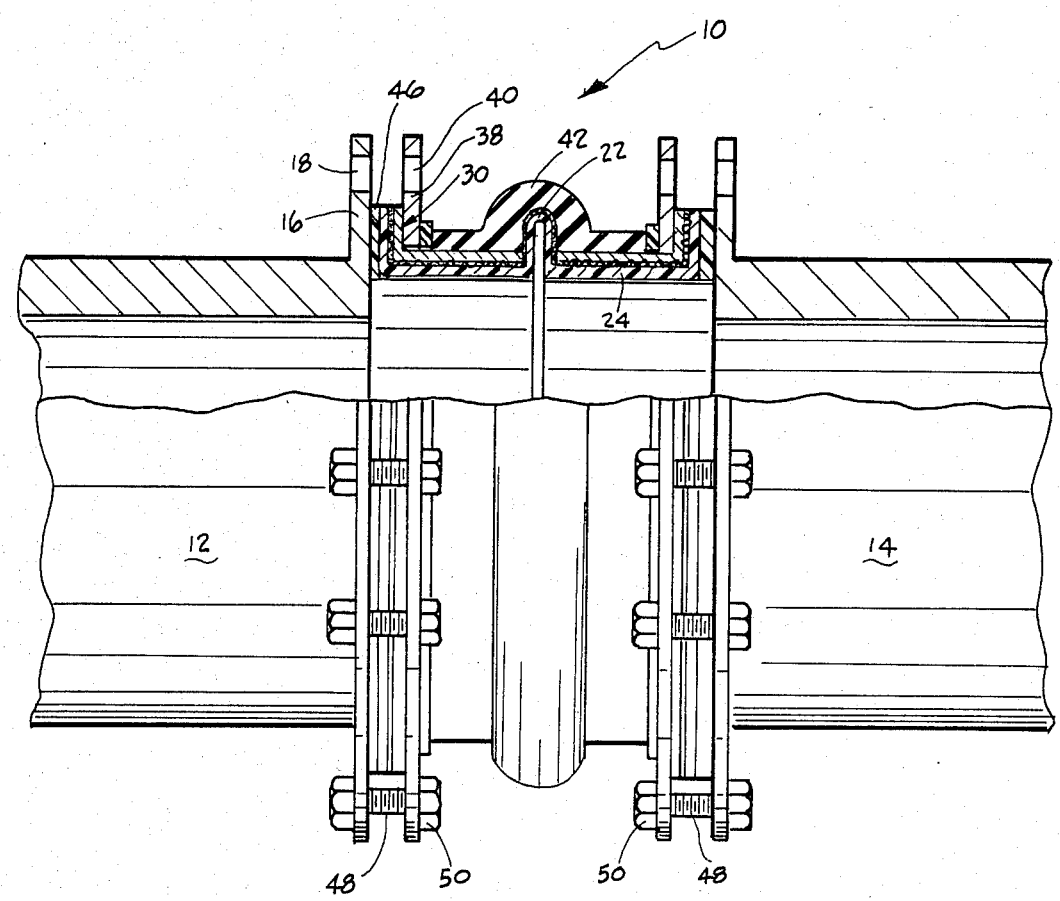
FIG. 1 is a side elevational view, partly in section, of an expansion joint according to the invention bolted in place between abutting pipe ends.
Figure 2:
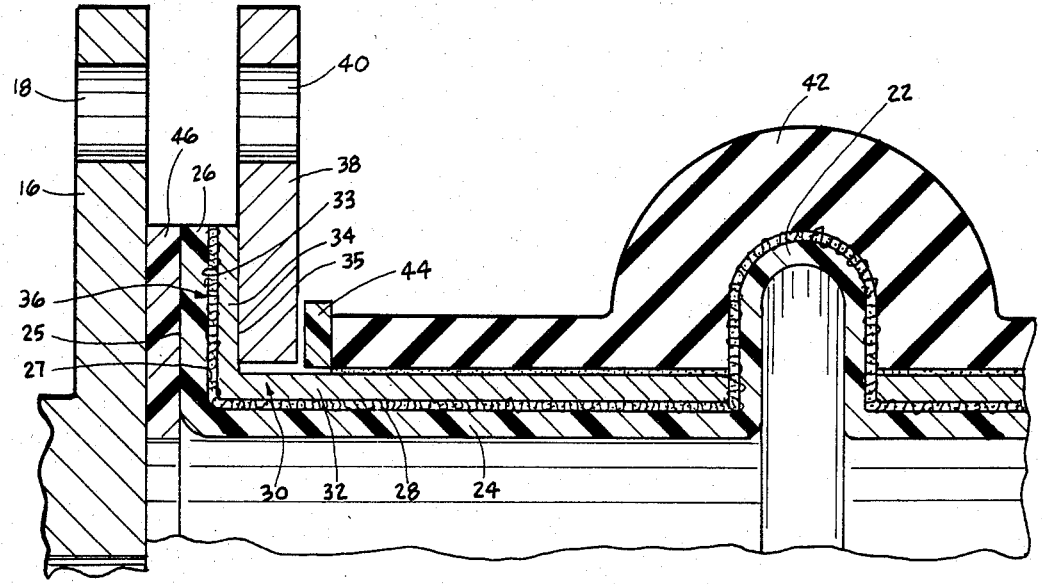
FIG. 2 is an enlarged, cross-sectional view of a portion of the expansion joint shown in FIG. 1 showing a fluorocarbon polymer liner and its relationship to the various structural components of the expansion joint.

Referring to FIG. 1, an expansion joint 10 is shown. The joint 10 is bolted in place between pipes 12 and 14. Each of the pipes 12, 14 includes a radially extending flange 16 having a plurality of axially extending apertures 18 disposed about its periphery. The structural details of the expansion joint 10, best seen in FIG. 2, include an annular arch 22 located at the middle of a tube 24 having an integral, radially extending flange 26 at each end. The flanges 26 are of generally smaller radial dimension than the radial dimension of the pipe flanges 16 and they do not include apertures of any kind. The tube flanges 26 have a front face 25 and a rear face 27, the front face 25 in use adapted to be in sealing relationship with the pipe end. The tube 24 is made of a fluorocarbon polymer, preferably tetrafluoroethylene (TFE). A ribbed, knit fabric 28, preferably of glass fibers, is embedded in the outer surface of the tube 24, such that a portion of the knit fabric 28 is exposed thereby providing a glueable surface. A preferred technique for securing the fabric 28 to the outer surface of the tube 24 is disclosed in the MacDonald patent, U.S. Pat. No. 3,723,234.

A stub end 30 is fitted about the tube 24 at each end of the tube 24 in proximity with the flanges 26. Each stub end 30 includes a tubular section 32 from which a flange 34 projects radially. The flange 34 has a front face 33 and a rear face 35, the front face 33 being in contact with the rear face 27 of the tube flange 26. The stub ends 30 preferably are of stainless steel although other materials of suitable strength may be used. The flanges 34 are secured to the flanges 26 by an adhesive indicated by the reference numeral 36. In the preferred embodiment, the adhesive 36 is Hysol EA 929 epoxy (available through Hysol/Dexter), although any adhesive having a service temperature in excess of around 350° F. and resistance to corrosive chemical attack is satisfactory.

A lap joint, or back-up ring 38, is positioned in contact with each of the flanges 34. The ring 38 includes a plurality of axially extending apertures 40 positioned about its periphery. Accordingly, flange 26 will be compressed between the ring 38 and the pipe flange 16 when the latter two are fastened together. An elastomer covering, or rubber back 42 having a high service temperature, such as ethylene-propylene diene monomer (EPDM) rubber, is vulcanized around the tubular sections 32 and the remaining outer exposed portion of the tube 24, the fabric 28, and the adhesive 36, thereby providing insulation and structural support. Prior to applying the back 42, a fluorocarbon polymer washer 44, preferably of TFE, is positioned adjacent the ring 38. Thus, after the back 42 has been vulcanized, free rotation of the ring 38 about the stub end 30 will be permitted. By rotating the ring 38, the apertures 40 can be aligned with the apertures 18 of the pipe flanges 16 to which the expansion joint 10 is fastened. An annular gasket 46 is placed between the flange 16 and the front face 25 of the flange 26 in order to provide desired sealing characteristics for the fluid being moved within the pipes 12, 14.

Manufacture of the Expansion Joint 10

The preferred method of manufacture of the expansion joint 10 begins with a cylindrical fluorocarbon polymer tube 24, such as tetrafluoroethylene (TFE), in which a knit fabric 28 of glass fiber is embedded, as taught by MacDonald in U.S. Pat. No. 3,723,234. Over the ends of the tube 24 are positioned, preferably in order, the TFE washers 44, the steel rings 38, and the stainless steel lap joint stub ends 30. The stub ends 30 are glued to the fabric-backed tube 24 using the adhesive 36. A length of the tube 24 is left protruding from the stub end flange 34. Assembly continues as follows:

1. For ease of transfer and later handling, the foregoing components are mounted on a mandrel (not shown). The mandrel preferably has fittings for a thermocouple to monitor the temperature of the tube 24 and an inlet for pressurized air.

2. The entire assembly is placed into a block heater (not shown) where the temperature of the tube 24 is brought to above the gel point (plastic state) of TFE, in this case around 622° F. In the preferred embodiment, the block heater is comprised of a pair of aluminum blocks in which heating elements such as resistance coils are located. A space in the aluminum block accommodates the tube 24 so that it is in contact with the walls of the aluminum blocks to provide for an efficient transfer of heat from the heated aluminum block to the tube 24.

3. Once the tube 24 is heated to above the point at which it becomes plastic, it is transferred, while still hot, from the block heater to a blow mold (not shown). The blow mold has an inner surface which will define the annular arch 22.

4. Once the hot tube 24 is placed within the blow mold, the ends of the tube are sealed off and compressed air is injected inside the tube. Since the tube 24 is in a plastic state when hot, it will expand to take the shape of its surrounding mold.

5. The expanded tube 24 is cooled within the blow mold. Cooling is effected in part by the compressed gases but primarily by a regulatable cooling means, such as a water-cooled jacket in the blow mold itself. Once the blow molded tube 24 has been cooled, its shape will be "set" or maintained.

6. The tube 24 is removed from the mold and the tube ends unsealed.

7. The ends of the tube 24 are flared using standard heated shapers. In the preferred embodiment, a heated metal cone shaper is inserted into the end of the tube 24, melting the tube 24 so that it begins to flare, preferably to around a 45° angle.

8. A flat heated plate is pressed against the flared end until it flares against the front face of the stub end flange 34.

9. The newly formed tube flange 26, which is somewhat flexible, may then be glued to the front face of the stub end flange 34 using the adhesive 36.

10. Uncured rubber is applied to the tubular section 32 and the remaining exposed areas of the tube 24 including the arch 22. In the preferred embodiment, ethylene propylene diene monomer (EPDM) rubber is used, although other rubbers also can be used. The uncured rubber is applied to the assembly in strips. Uncured rubber is a sticky liquid which will seep into the fabric 28 and also will stick to the tubular section 32. The washers 44 serve to keep the rubber from adhering to the rings 38, allowing free rotation of the rings 38 about the stub ends 30.

11. The assembly is placed into a heated mold (not shown), the inner surface of which has generally the same shape as the tube 24 with the "blown in" arch 22, although the heater is somewhat larger to accommodate the applied uncured rubber The uncured rubber backing then is vulcanized in the mold, after which the now-completed expansion joint 10 is removed, ready for service.

In service, the expansion joint 10 and gasket 46 are secured in place between the adjacent ends of the pipes 12, 14 by bolts 48 and nuts 50. The flanges 26 of the expansion joint 10 are rendered non-flexible largely by virtue of the presence of the stub end flanges 34; compressive forces applied to the flanges 34, and the rings 38 by the bolts 48 and nuts 50 will tend to be uniformly distributed over the entire contacting surfaces of the flanges 26 and the gaskets 46. Because the flanges 26 are less flexible than similar flanges in prior expansion joints, separation of the back 42 from the tube 24 is minimized or eliminated. In turn, the joint 10 has an exceedingly long life while retaining desired characteristics of flexibility and leak resistance.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. An expansion joint for connecting pipe ends, comprising:
(a) a flexible tube having radially extending flanges at each end, the flanges having a front face and a rear face, each front face in use adapted to be in sealing relationship with a pipe end;
(b) a tubular stub end disposed about the tube at each end of the tube, each stub end having a radially extending flange at one end, the flange having a front face and a rear face, the front face of each stub end flange being in contact with the rear face of a tube flange; and
(c) a back-up ring disposed about the tube at each end of the tube, each back-up ring being in abutting relationship with the rear face of a stub end flange, each back-up ring having fastening means for connecting the back-up ring to a pipe end, at least one of the fastening means having a radial extent greater than the stub end flange with which the back-up ring is in contact.

2. The expansion joint of claim 1, further comprising an elastomeric backing fastened to the tube.

3. The expansion joint of claim 2, wherein the elastomeric backing is rubber.

4. The expansion joint of claim 2, further comprising a washer spaced between the elastomeric backing and each back-up ring.

5. The expansion joint of claim 1, wherein the stub ends are held in fixed relation to the tube by fastening means.

6. The expansion joint of claim 5, wherein the fastening means comprise any of a class of high temperature, chemically resistant adhesives.

7. The expansion joint of claim 1, wherein the tube is composed of a fluorocarbon polymer.

8. The expansion joint of claim 7, wherein the fluorocarbon polymer is tetrafluoroethylene.

9. The expansion joint of claim 7, wherein the fluorocarbon polymer tube has a knit reinforcing fabric embedded within and mechanically interlocked with the fluorocarbon polymer.

10. The expansion joint of claim 1, wherein the stub ends are of metal.

11. The expansion joint of claim 10, wherein the stub ends are of stainless steel.

12. The expansion joint of claim 1, further comprising an annular arch integral with the tube and disposed between the tube flanges.

13. An expansion joint for connecting pipe ends comprising:
(a) a tetrafluoroethylene polymer tube having a knit reinforcing fabric embedded within and mechanically interlocked with the polymer each end of the tube having a radially extending flange, the flange having a front face and a rear face, the front face in use adapted to be in sealing relationship with the pipe end, the tube having an annular arch spaced between the tube flanges;
(b) a steel stub end having a radially extending flange at one end, the flange having a front face and a rear face, the front face of the stub end flange being in contact with the rear face of the tube flange;

(c) a rubber backing fastened to the knit reinforcing fabric embedded in the tube;

(d) a back-up ring disposed about the tube at each end of the tube, the ring being in contact with the back face of the stub end flange, the rings having apertures through which fasteners may be fitted to secure the rings to the pipe ends, thereby compressing the tube flanges between the back-up rings and the pipe ends; and (e) a washer spaced between the rubber backing and the back-up ring, the washer preventing the rubber from binding the ring, whereby the ring is permitted to rotate about the tube between the washer and rear face of the stub end flange, allowing alignment of the ring peripheral fastener apertures with corresponding apertures in the pipe flange to which the expansion joint is fastened.

14. An expansion joint for connecting pipe ends, comprising:

(a) a flexible tube having radially extending flanges at each end, the flanges having a front face and a rear face, the front face in use adapted to be in sealing relationship with the pipe end, said flexible tubing having an elastomeric backing attached thereto;

(b) a tubular stub end having a radially extending flange at one end, the flange having a front face and a rear face, the front face of the stub end flange being in contact with the rear face of the tube flange;

(c) a back-up ring disposed about the tube, the back-up ring in abutting relationship with the rear face of the stub end flange; the ring having fastening means whereby the ring is secureable to the pipe end to be connected, thereby compressing the tube flanges between the back-up ring and the pipe ends; and (d) a washer spaced between the elastomeric backing and the back-up ring.

15. An expansion joint for connecting pipe ends comprising:

(a) a fluoropolymer tube having a knit reinforcing fabric embedded within and mechanically interlocked with the polymer, each end of the tube having a radially extending flange, the flange having a front face and a rear face, the front face in use adapted to be in sealing relationship with the pipe end, the tube having an annular arch spaced between the tube flanges;

(b) a steel stub end having a radially extending flange at one end, the flange having a front face and a rear face, the front face of the stub end flange being in contact with the rear face of the tube flange;

(c) a rubber backing fastened to the knit reinforcing fabric embedded in the tube;

(d) a back-up ring disposed about the tube at each end of the tube, the ring being in contact with the back face of the stub end flange, the rings having apertures through which fasteners may be fitted to secure the rings to the pipe ends, thereby compressing the tube flanges between the back-up rings and the pipe ends; and (e) a washer spaced between the rubber backing and the back-up ring, the washer preventing the rubber from binding the ring, whereby the ring is permitted to rotate about the tube between the washer and rear face of the stub end flange, allowing alignment of the ring peripheral fastener apertures with corresponding apertures in the pipe flange to which the expansion joint is fastened.

* * * * *